Patented Oct. 23, 1934

1,977,625

UNITED STATES PATENT OFFICE 1,977,625

PROCESS OF DECORATING GLASS

Arthur H. Ernst, Woodbridge, N. J., assignor, by mesne assignments, to E. I. du Pont de Nemours and Company, a corporation of Delaware No Drawing. Application November 11, 1931, Serial No. 574,465

5 Claims. (Cl. 91—70.1)

This invention relates to a process for decorating ceramic objects, and more particularly, to the application of noble metals to ceramic objects and especially to glass.

The usual method for applying noble metals to ceramic ware comprises applying the metal or its compound in some suitable vehicle such as a liquid or a paste to the surface of the object to be decorated while cold and thereafter firing the decorated object to the point where the vehicle used to carry the metal has been burned off and the metal matured. It has also been proposed to spray molten metals on glass and other ceramic objects.

An object of this invention is to improve the process of decorating ceramic ware with noble metals. A further object is to apply noble metals to hot ceramic objects and thereby simultaneously apply and fire the decoration. A further object is to coat glass with noble metals, especially silver, before said glass has completely cooled after molding.

These objects may be accomplished by spraying the ceramic objects while still hot from glazing or molding operations, or after being suitably reheated, with a liquid preparation comprising a decomposable noble metal salt or compound, a flux and an organic reducing compound.

The invention will now be further illustrated by reference to a process for decorating glass with silver. By way of example several suitable compositions will now be given.

Example I

A spraying mixture was made having the following composition:

|  | Percent |
|---|---|
| Silver oxide | 0.60 |
| Lead borate flux | 0.11 |
| Rosin ("G" gum) | 32.62 |
| USP copaiba balsam | 10.00 |
| Turpentine | 56.67 |

The above materials were thoroughly mixed and then applied with an air spray on glass bottles which were at a temperature of about 600° C. After spraying the bottles they are annealed in the usual manner. A brilliant silver decoration which adhered firmly to the glass was obtained.

Example II

|  | Percent |
|---|---|
| Water | 67.2 |
| Cane sugar | 16.8 |
| Silver nitrate | 13.5 |
| Lead acetate | 2.5 |

These ingredients were thoroughly mixed and the mixture sprayed on the bottles while hot as in Example I. A brilliant silver decoration adhering firmly to the glass was produced.

I have also obtained good results by replacing the sugar in the above formula with other organic reducing agents such as glycerine, gum arabic or gum tragacanth.

The temperature of the ware to which the decoration is applied is of importance. It has been found that if the temperature is too low the bottles are rapidly cooled beyond their critical temperature by evaporation of the liquid portion of the decorative mixture and are likely to develop cracks or break. For molded soda lime glass bottles this critical temperature is about 600 to 750° C., but will vary with other types of ware. The exact lower temperature must be determined by experiment. However, in general the decorative mixes may be applied to the glass ware immediately after its removal from the mold as in commercial practice.

This invention is not restricted to the examples given above since the compositions employed are subject to considerable variation. For example, silver oxide in the above formula may be replaced by other heat decomposable silver compounds, such as silver nitrate or silver resinate. The amount of silver used may vary widely. A gold decoration may be produced by replacing the silver oxide by a gold compound, e. g. gold chloride. The exact proportions of gold employed will depend on the type of decoration desired. In using gold one should preferably also employ rhodium (1–3% of the gold) and bismuth (3–6% of the gold) compounds in order to impart a bright finish to gold decorations. Platinum, alone or mixed with gold and subject to the same restrictions, may likewise be employed. Palladium resinate and gold in a ratio of 1–5 to 10 may also be used.

While I prefer to employ lead borate as a fluxing material, and have found that a combination of lead borate prepared by fusing 71 grams of lead oxide (red lead) 29 grams of boric acid ($B_2O_3$) and 3 grams of ammonium nitrate at about 500° C. and in an oxidizing atmosphere is particularly suitable, other combinations of lead and boric acid having suitable melting points, that is about 500–650° C. may also be employed. These compositions should be ground in organic media on account of their solubility in water. The lead acetate may be replaced by other water soluble lead salts. The exact amounts of metallic decoration constituent relative to the flux and other inert ingredients will of course depend upon the nature of the ware to be decorated and also on the type and thickness of decoration which is desired. Consequently, this must be subject to some experimentation to determine the optimum proportions for particular purposes. In general fluxes for glass will comprise 10-20% of the weight of the metallic decoration constituent, while for china, tile, etc., the flux content may be lower.

The type of glass to which the decoration is applied will also to some extent determine the ratio of decorative material to flux in order to give the maximum adherence. Thus, soft stem ware naturally cannot be fired to 600° C. since this type ware deforms at this temperature. By suitable variations of flux to decorative material, a composition giving sufficiently low desirable melting points may be attained.

An excess of reducing agent is desirable. Depending upon the activity of the reducing agent, and the readiness with which the metallic compound is reduced or decomposed, it is sometimes desirable to use the decoration preparation here described soon after mixing to prevent the reduction and agglomeration of the metallic decorative constituent.

To avoid an unnecessary duplication of claims I desire the term "noble metals", to include gold, platinum, palladium, silver and other metals of this group. The term "ceramic ware" is intended to cover china, tile, terra cotta, glass and other materials of this nature as well as metals covered with enamels.

I claim:

1. Process for the decoration of ceramic ware having a surface susceptible of cracking or breaking when hot on the application of cold which comprises spraying said ceramic ware with a liquid preparation comprising a noble metal constituent, a flux and a reducing agent while said ware is at a temperature above the critical point at which cracks or breaks are likely to develop and at such temperature at which the coating will flux to the surface but below the temperature at which deformation begins.

2. Process comprising spraying glass at a temperature above the critical point at which cracks or breaks are likely to develop and at a temperature such that the coating adheres to the surface and below the temperature at which deformation begins with a liquid preparation comprising a noble metal constituent decomposable at said temperature, a flux and a reducing agent.

3. Process for decorating glass surfaces comprising spraying said surface at a temperature above its critical temperature at which cracks or breaks are likely to develop and at a temperature at which the coating fluxes to the surface but below the temperature at which deformation begins with a liquid preparation comprising a noble metal compound reducible at said temperature, a flux and a reducing agent.

4. Process for decorating glass bottles comprising spraying said bottles at a temperature of about 600° C. with a liquid mixture comprising silver oxide, lead borate and an organic reducing agent.

5. Process for decorating soda lime glass with silver comprising spraying said glass at a temperature of about 600° C. with a mixture comprising silver nitrate, lead acetate, water and a soluble organic reducing agent.

ARTHUR H. ERNST.